United States Patent Office
3,481,943
Patented Dec. 2, 1969

3,481,943
BENZYL AND PYRIDYLMETHYL SUBSTITUTED
AMIDO AMINO PYRIDINES
Kurt Thiele and Walter von Bebenburg, Frankfurt am
Main, Germany, assignors to Deutsche Gold- und Silber-
Scheideanstalt vormals Roessler, Frankfurt am Main,
Germany
No Drawing. Filed May 10, 1967, Ser. No. 637,322
Claims priority, application Germany, May 12, 1966,
D 50,092, D 50,093
Int. Cl. C07d 31/44; A61k 27/00
U.S. Cl. 260—295                              5 Claims ABSTRACT OF THE DISCLOSURE
Pharmacological compounds of the formula

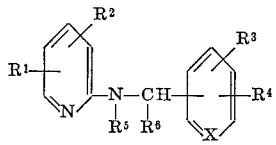

and their pharmacologically acceptable acid addition salts wherein: $R^1$ signifies an acylamino group $R^7$ NH—wherein $R^7$ is an acyl group derived from carbonic acid, carbonic acid semimorpholide, carbonic acid monoesters, such as the lower alkyl and alkenyl monoesters of carbonic acid, benzoic acids, preferably, substituted benzoic acids, pyridine carboxylic acids, preferably, substituted pyridine carboxylic acids, saturated or unsaturated lower aliphatic mono or dicarboxylic acids, which, if desired, may be substituted with a morpholino group; each of $R^2$, $R^3$ and $R^4$ can signify the same as $R^1$ or hydrogen, halogen, lower alkyl, trifluoromethyl, cyano, thiocyanato, mercapto, lower alkylthio, acylthio, hydroxy, lower alkoxy, methylene dioxy, acyloxy, nitro, amino, carboxy, carbalkoxy or carbamoyl; $R^5$ signifies hydrogen or an acyl group $R^6$ is hydrogen, lower alkyl or aralkyl, preferably, phenyl lower alkyl and X signifies =N— or =CH—, the acyl groups included in $R^2$, $R^3$, $R^4$ or $R^5$ being as defined for $R^7$.

The benzoic acids and the pyridine carboxylic acids from which the acyl groups $R^7$ are derived can be mono or poly substituted by halogen, hydroxy, trifluoromethyl, lower alkyl, lower alkoxy, methylene dioxy, acyloxy, amino, alkylamino, acylamino, cyano, isocyanato, nitro, mercapto, lower alkylthio, acylthio, carboxy, carbethoxy and carbamino. The acyl groups in such substituents again being as defined.

RELATED APPLICATION

U.S. application Ser. No. 481,938, filed Aug. 23, 1965, now Patent No. 3,375,257 concerns related compounds.

BACKGROUND AND SUMMARY OF THE INVENTION

The present invention concerns compounds of the formula

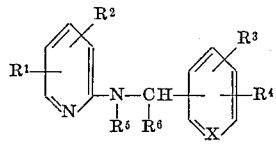

and their pharmacologically acceptable acid addition salts wherein $R^1$ through $R^6$ and X are as defined above.

These compounds differ from the class of compounds described in application Ser. No. 481,938 by the inclusion of the

group between

and the phenyl or pyridyl nucleus and furthermore by the fact that they possess marked analgesic properties not possessed by the compounds of Ser. No. 481,938 and furthermore also possess antipyretic and anti-inflammatory (an tiphlogistic) activity. The analgesic action of the compounds according to the invention already occurs at dosages at which the anti-inflammatory activity is not yet detectable.

The compounds according to the invention, for instance, exhibit a strong analgesic activity in the mouse tail test according to Haffner, a strong anti-inflammatory activity on albumen edema of the rat paw and a good antipyretic action on yeast fever of the rat at oral dosages between 1 and 300 mg./kg. The compounds exhibit a favorably low toxicity which expressed as $LD_{50}$ in mg./kg. of between 400 and 2700 when orally administered to mice.

The following indications come into question for the compounds according to the invention:

Indications as pain relieving medicament: Pains of all geneses.

Indications as anti-inflammatory medicament: Chronic polyarthritis, rheumatic diseases, posttraumatic inflammations, swellings resulting from fractures, thrombophlebitis of all forms, including postoperative bursitis, synovitis, collagenoses (polymyositis, periarteriitis), gout, intraperitoneal adhesions.

Indications as antipyretic medicament: Fevers in illnesses of all geneses.

The application can be interal or parenteral, for example, in the form of tablets, capsules, pills, suppositories, solutions, suspensions, injections and the like.

The novel compounds according to the invention can be prepared by conventional methods, such as, for instance:

(a) Reacting a compound of the formula

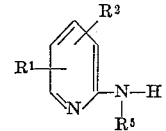

with a compound of the formula

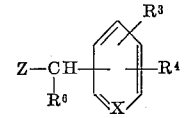

in which Z is either a halogen atom or the group $NHR^5$ or the group $OR^8$ in which $R^8$ is hydrogen, lower alkyl or phenyl, with or without a solvent, preferably, in the presence of a condensing agent at raised temperature.

(b) Condensing a compound of Formula I with a compound of the formula

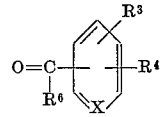

with simultaneous reduction.

(c) Reacting a compound of the formula

wherein Y is a halogen atom, or a hydroxy, lower alkoxy or phenoxy group or the group —SO$_2$CH$_3$ or SO$_3$W in which W is hydrogen or alkali metal with a compound of the formula

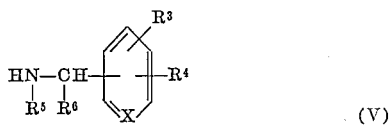

with or without a solvent as in (a) and, if desired, simultaneously or subsequently acylating any amino group present and/or, if desired, converting any functional groups preset by known methods, such as, alkylation, acylation, saponification or by reaction with ammonia or an amine. The bases thus obtained can be converted into their salts. The bases which contain an optically active carbon atom and which as a rule are obtained in racemate form can be resolved in a known manner into their optically active isomers with an optically active acid and fractional precipitation or crystallization. It, however, also is possible to employ optically active starting materials.

It is generally advisable to employ temperatures between about 80 and 250° C. in methods (a) and (c) but in method (a) when Z is a hydroxy group higher temperatures of up to about 400° C. may be necessary. Method (b) expediently is carried out at temperatures between about 20 and 150° C. Water, alcohols, benzene, toluene, dioxane, dimethylformamide, N-methylpyrrolidone, dimethylsulfone, sulfolane, tetramethyl urea, for instance, may be used as solvents.

The condensing agents for methods (a) and (c) when Z and Y represent halogen, for instance, can be sodium acetate, sodium amide, alkali metal carbonates and tertiary amines. Zinc chloride, phosphorus oxychloride, p-toluene sulfonic acid, iodine and the like can be used as condensing agents in method (a) when Z is NHR$^5$. Zinc chloride, calcium chloride, triethyl phosphate, for instance, can be used in methods (a) and (c) when Z and Y signify a hydroxy group or R$^8$O. Zinc chloride and copper chloride can, for instance, be used as condensing agent in method (c) when Y is SO$_3$W.

The subsequent acylation of amino groups can be carried out by known methods using the corresponding acid chlorides, anhydrides or esters. If the amino group carrying R$^5$ is not to be acylated, acid chlorides or anhydrides are preferably used at temperatures below 60° C., preferably at 0° to 30° C. When more than one amino group is present in addition to that carrying R$^5$, partial acylation (not considering the amino group carrying R$^5$) can be effected by employing only enough acid halide for acylation of one amino group, whereby the non-acylated amino group is converted to the hydrochloride.

The acylation of the amino group carrying R$^5$ can also be carried out with acid halides but at temperatures above 60° C. for instance, 70 to 120° C. Longer reaction periods are required for such acylation.

In the event any of the substituents R$^1$–R$^4$ in the compounds obtained by methods (a)–(c) is a nitro group, it can be reduced by catalytic hydrogenation, for instance, with Raney nickel, palladium or platinum as catalyst to an amino group. Temperatures between 20 and 80° C. and gauge pressures of 5 to 20 atmospheres can be employed for such hydrogenation. The reduction can also be effected with nascent hydrogen, such as, for example, with zinc/HCl or with salts of hydrogen sulfide in alcohol/water at about 70 to 120° C. or with activated aluminum in water containing ether at 20 to 40° C. or with Sn (II) chloride/HCl.

The following examples will serve to illustrate the compounds according to the invention with reference to a number of representative specific embodiments. The hydrochlorides of various of the compounds produced in such examples can be converted to the free base by treatment with ammonia or NaOH.

Example 1

(a) 2-benzylamino-5-acetamino pyridine

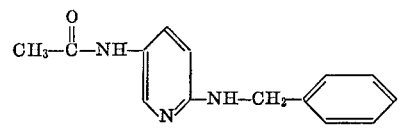

80 g. of 2-chloro-5-nitro-pyridine were added portionwise while stirring at 160° C. to 110 g. of benzylamine. After completion of the exothermic reaction the reaction mixture was poured into water and the precipitated product filtered off and recrystallized from ethanol. Yield 100 g. (82% of theory) of 2-benzylamino-5-nitro pyridine of a melting point of 133–4° C. After addition of 30 g. of Raney nickel to the latter, it was hydrogenated in 500 ml. of methanol at 50° C. at a gauge pressure of 20 atmospheres. After completion of the hydrogenation the catalyst was filtered off and 56 g. (67% of theory) of 2-benzylamino-5-amino-pyridine were recovered by distillation from the filtrate after it had been boiled down. Its boiling point at 0.2 torr was 180–185° C.

10 g. of acetic acid anhydride were added portionwise to a solution of 20 g. of 2-benzylamino-5-amino pyridine in benzene while maintaining a temperature below 40° C. The solution from which a portion of the product had separated was boiled down and the residue stirred with ether and the solid product filtered off, triturated with a small quantity of aqueous soda and recrystallized from methanol.

Yield 13 g. of 2-benzylamino-5-acetamino-pyridine of a melting point of 140–141° C.

(b) 2-benzylamino-5-carbethoxyamino-pyridine·HCl

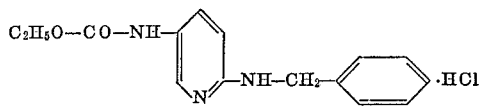

9.6 ml. of chloroformic acid ethyl ester were added portionwise to a mixture of 20 g. of 2-benzylamino-5-amino pyridine, 8.5 ml. of pyridine and 100 ml. of acetone and the mixture stirred for 30 mintues at room temperature. The solution was boiled down and the residue dissolved in benzene, the solution shaken with water and the benzene phase dried and boiled down. The residue was dissolved in methanol and acidified with isopropanolic HCl and clarified over charcoal. The hydrochloride which crystallized out was filtered off and recrystallized several times from methanol-ether. Yield 11 g., melting point 145–6° C.

Example 2

(a) 2 - (2 - picolylamino) - 5 - carbethoxyamino - pyridine·HCl

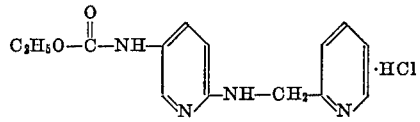

A mixture of 108 g. (1 mol) of 2-picolylamine, 1.5 liters isopropanol, 158 g. (1 mol) of 2-chloro-5-nitro-pyridine and 138 g. of powdered potassium carbonate was boiled under reflux while stirring for 7 hours. After cooling the solids were filtered off and freed from inorganic salts by repeatedly washing with water. Yield 210 g. (86.7% of theory) of 2-picolylamino-5-nitro-pyridine of a melting point of 156–7° C.

190 g. (0.78 mol) of the latter were hydrogenated in 1.5 liters of methanol after addition of 30 g. of Raney nickel at 60° C. under a gauge pressure of 60 atmospheres. The solution was filtered, boiled down and the residue distilled under vacuum at 0.7 torr at 210–220° C. The solid distillate was recrystallized from isopropanol. Yield 152 g. (97% of theory) of 2-(2-picolylamino)-5-amino-pyridine of a melting point of 100° C. The substance was sensitive to air.

10.8 g. of chloroformic acid ethyl ester were added portionwise to a solution of 20 g. (0.1 mol) of the 2-(2-picolylamino)-5-amino-pyridine in 100 ml. of acetone and 8 ml. of pyridine. After standing for 6 hours the reaction mixture was poured into 300 ml. of water, alkalized to a pH of 8–9 and extracted with benzene. The benzene solution was dried and boiled down. Isopropanolic HCl was added to the residue and the 2-(2-picolylamino)-5-carbethoxyamino-pyridine·HCl recrystallized twice from 1:1 ethanol-methanol. The yield was 7.2 g. (21.4% of theory). Its melting point was 230° C.

(b) 2-(2-picolylamino)-5-propionylamino-pyridine

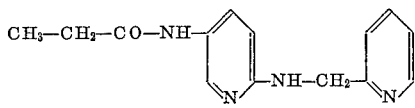

was produced analogously employing propionyl chloride instead of the chloroformic acid ethyl ester. The product was recrystallized as the base from isoproponal. Its melting point was 126–7° C. Yield 37% of theory.

(c) 2 - (2 - picolylamino) - 5 - (p - chlorobenzamino) pyridine

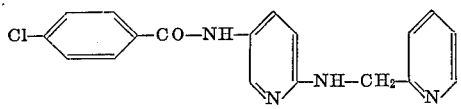

17.5 g. of p-chlorobenzoyl chloride were added portionwise while stirring to a mixture of 20 g. (0.1 mol) of 2-(2-picolylamino)-5-amino-pyridine in 100 ml. of acetone and 8 ml. of pyridine at 30° C. After standing for 6 hours the reaction mixture was poured into water and alkalized with NaOH. The reaction product which precipitated was filtered off and recrystallized twice from methanol. Yield 14.9 g. (44% of theory). Melting point 187° C.

Example 3

(a) 2 - amino - 3 - carbethoxyamino - 6 - benzylamino-pyridine·HCl

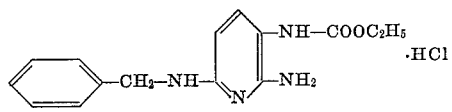

172 g. (1.6 mol) of benzylamine were gradually added to 69.6 g. (0.4 mol) of 2-amino-3-nitro-6-chloro-pyridine while stirring at 90° C. An exothermic action occurred. After the addition was completed, the mixture was stirred for 30 minutes at 100° C. and dissolved in 1 liter of acetone. Sufficient water was added to effect clouding. The 2-amino-3-nitro-6-benzylamino-pyridine which crystallized out was analysis pure. Yield 87 g. (94% of theory). Melting point 132° C.

99 g. of the product produced as described was hydrogenated in 400 ml. of dioxane in the presence of 30 g. of water free Raney nickel and 40 g. of water free sodium sulfate at 50° C. under a gauge pressure of 20 atmospheres. The hydrogenation mixture was filtered under nitrogen. The base, 2,3-diamino-6-benzyl-amino-pyridine crystallized out after addition of a small quantity of ether and gasoline. The base was very sensitive to oxygen and on access to air discolored to a deep blue. Its melting point was 80–90° C. The hydrochloride could be obtained directly from the filtered hydrogenated solution by addition of isopropanolic HCl. Yield 65% of theory. Melting point 217–8° C.

40 ml. of chloroformic acid ethyl ester were added to 50 g. of the crude 2,3-diamino-6-benzyl-amino-pyridine (base) in 300 ml. of dioxane and the mixture stirred until the reaction subsided. The 2-amino-3-carbethoxy product crystallized out and was filtered off and recrystallized from ethanol. Yield 62 g. Melting point 208–209° C.

(b) 2 - amino - 3 - carbopropoxyamino - 6 - benzyl-amino-pyridine·HCl. 25 ml. of chloroformic acid propyl ester were added to 25 g. of crude 2,3-diamino-6-benzyl-amino-pyridine produced as above in 200 ml. of dioxane and the mixture stirred until the reaction subsided. The product which crystallized out was filtered off and recrystallized from ethanol. Yield 40 g. Melting point 225–30° C.

(c) 2 - amino - 3 - acryloylamino - 6 - benzylamino-pyridine·HCl was prepared analogously using 15 ml. of acrylic acid chloride instead of the chloroformic acid propyl ester. Yield 30 g. Melting point 230–5° C.

(d) N - [2 - amino - 6 - benzylaminopyridyl - (3)]carbamic acid isopropyl ester·HCl

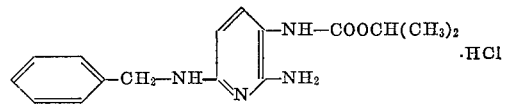

was prepared analogously using 25 ml. of chloroformic acid isopropyl ester instead of the acrylic acid chloride. Yield 35 g. Melting point 225–30° C. (decomposition).

Example 4

(a) 2 - amino - 3 - carbethoxyamino - 6 - (m - trifluoromethylbenzyl)pyridine·HCl

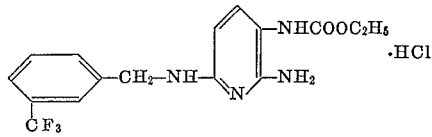

80 g. (0.46 mol) of 2-amino-3-nitro-6-chloropyridine were added portionwise to a mixture of 80 g. (0.46 mol) of m-trifluoromethyl-benzylamine, 200 ml. of n-propanol and 36.5 g. of powdered potash at 90° C. while stirring. After the exothermic reaction was completed the mixture was stirred for a further 30 minutes at 90° C. The mixture was poured into water and after standing for some time the supernatant liquid was decanted off from the precipitated product. The precipitate was dissolved in benzene and the solution dried and filtered and gasoline added to the filtrate until clouding occurred. The crystallized yellow product, 2-amino-3-nitro-6-(m-trifluoromethylbenzylamino)pyridine, was filtered off. Yield 74 g. Melting point 105–8° C.

34 g. of this product were hydrogenated at 50° C. at a gauge pressure of 50 atmospheres in 450 ml. of dioxane in the presence of water free Raney nickel and water free sodium sulfate. After filtering the resulting hydrogenated solution, the 2,3-diamino-6-(m-trifluoromethyl-benzyl)pyridine-dihydrochloride was precipitated therefrom with the aid of isopropanolic HCl. After filtering it off it was recrystallized from ethanol. Yield 20 g. Melting point 205° C.

14 ml. of chloroformic acid ethyl ester were added portionwise to a hydrogenated solution produced as above. After 30 minutes the reaction product crystallized out which was filtered off after cooling and recrystallized from isopropanol-ether-gasoline. Yield 20 g. of 2-amino-3 - carbethoxyamino-6-(m-trifluoromethyl - benzyl)pyridine·HCl. Melting point 213° C.

(b) 2 - amino-3-carbphenethoxyamino-6-(m - trifluoromethyl-benzylamino-pyridine·HCl. 12 g. of chloroformic acid-β-phenethyl ester were added portionwise to a hydrogenated solution as produced in 4(a). After the reaction subsided a small quantity of ether was added gradually while stirring. The product crystallized slowly and after filtering off was recrystallized from methanol/water. Yield 30 g. Melting point 150–60° C.

(c) 2 - amino-3-acryloylamino-6-(m - trifluoromethyl-benzyl-amino)pyridine hydrochloride was prepared in a manner analogous to that of 4(b) using acrylic acid chloride instead of the chloroformic acid-β-phenethyl ester. Yield 42% of theory. Melting point 230–5° C.

Example 5

(a) d,l-2-amino-3-propionylamino-6-[1-phenyl - ethyl-(1)-amino]pyridine·HCl.

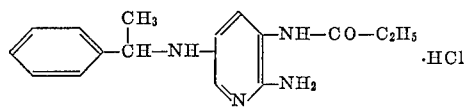

17.3 g. (0.1 mol) of 2-amino-3-nitro-6-chloro-pyridine were added portionwise while stirring into 48 g. (0.1 mol) of d,l-1-phenyl-ethylamine at 90° C. After the reaction subsided, the reaction mixture was heated for a further 10 minutes to 100° C. and thereafter 75 ml. of glacial acetic acid and 200 ml. of water were added thereto. The syrup which separated out was taken up in ether and the ether solution washed thoroughly with water and dried. Upon addition of isopropanolic HCl the crystalline hydrochloride precipitated. The latter was filtered off and dissolved in 1:1 methanol-water and aqueous ammonia added thereto. The oil which separated out crystallized upon rubbing. Yield 21 g. (81% of theory) of d,l-2-amino-3-nitro-6-[1-phenyl-ethyl-(1)-amino]pyridine. Melting point 104–6° C.

A mixture of 103 g. (0.4 mol) of such 2-amino-3-nitro product produced as described, 600 ml. of dioxane, 50 g. of water free sodium sulfate and 35 g. of Raney nickel was hydrogenated at 50° C. under a gauge pressure of 50 atmospheres to produce the corresponding 2,3-diamino product.

¼ of the hydrogenated solution thus obtained was reacted with 10 ml. of propionyl chloride. After 10 minutes the reaction product crystallized out. After one hour's standing it was filtered off and recrystallized from a small quantity of water. Yield 12 g. (42% of theory) of d,l-2-amino-3-propionylamino-6-[1-phenyl - ethyl - (1)-amino]pyridine·HCl. Melting point 205–10° C.

(b) A further quantity of the hydrogenated solution obtained as above was reacted analogously with chloroformic acid ethyl ester to produce d,l-2-amino-3-carbethoxyamino - 6 - [1-phenyl - ethyl - (1) - amino]pyridine·HCl. It crystallized slowly from dioxane/ether. Yield 8 g. (24% of theory). Melting point 155–7° C.

The 2-amino-3-nitro compounds which were the starting bases for the preparation of the acylated compounds in the following examples were produced analogously to the 2-amino-3-nitro compounds employed in Examples 3–5 using 2 - amino-3-nitro-6-chloro-pyridine and the appropriately substituted benzyl amine.

Example 6

(a) 2-amino - 3 - carbethoxyamino-6 - p - methoxy-benzylamino-pyridine·HCl.

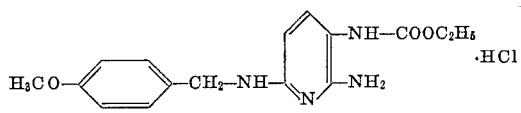

A solution of 110 g. of 2-amino-3-nitro-6-p-methoxy-benzylamino-pyridine in 1 liter of dioxane containing 50 g. of Raney nickel was hydrogenated at 50° C. under a gauge pressure of 50 atmospheres. The hydrogenated solution was filtered and 40 ml. of chloroformic acid ethyl ester added thereto portionwise while stirring. After 2 hours' standing the precipitate was filtered off and recrystallized from methanol. Yield 86 g. Melting point 202° C. (decomposition).

(b) 2-amino-3-pivaloylamino-6-p - methoxy - benzyl-amino-pyridine·HCl. The procedure under (a) was repeated using pivalic acid chloride instead of the chloroformic acid ethyl ester. Yield 17 g. from 27.5 g. of the nitro compound. Melting point 225–6° C.

Example 7

(a) 2 - amino - 3 - carbethoxy - 6 - p - chlorobenzyl-amino-pyridine·HCl

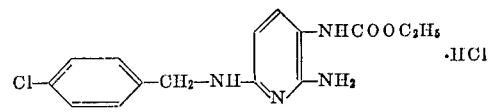

105 g. of 2-amino-3-nitro-6-p-chlorobenzylamino-pyridine in 500 ml. of dioxane were hydrogenated as in Example 6(a) and a quarter of the hydrogenated solution reacted with 10.8 ml. of chloroformic acid ethyl ester and the product recrystallized as in Example 6(a). Yield 6 g. Melting point 219–20° C.

(b) 2 - amino - 3 - acetamino - 6 - p - chlorobenzyl-amino-pyridine-hydrochloride. A quarter of the hydrogenated solution obtained under (a) was reacted with 7.8 ml. of acetyl chloride and processed analogously. Yield 7.5 g. Melting point 260° C. (decomposition).

Example 8

(a) 2 - amino - 3 - carbethoxy - amino - 6 - o - chloro-benzylamino-pyridine-hydrochloride. 72 g. of 2-amino-3-nitro-6-o-chlorobenzylamino-pyridine were hydrogenated in a manner analogous to that of Example 7(a). One quarter of the hydrogenated solution was reacted with 7.7 ml. of chloroformic acid ethyl ester and processed as in Example 7(a). Yield 14.3 g. Melting point 171° C.

(b) 2 - amino - 3 - propionylamino - 6 - o - chloro-benzylamino-pyridine·HCl was produced analogously using propionyl chloride. Yield 14.1 g. Melting point 242–4° C.

(c) 2 - amino - 3 - acryloylamino - 6 - o - chlorobenzyl-amino-pyridine·HCl was produced analogously using acryloyl chloride. Yield 14.1 g. Melting point 230–2° C. (decomposition).

Example 9

(a) 2 - amino - 3 - carbethoxy - 6 - (3,4-methylene-dioxybenzylamino)pyridine·HCl. 102 g. of 2-amino-3-nitro-6-(3,4-methylene-dioxybenzylamino)pyridine in 500 ml. of dioxane were hydrogenated in a manner analogous to that of Example 7(a) and a quarter of the hydrogenated solution reacted with 9.5 ml. of chloroformic acid ethyl ester and processed as in Example 7(a) except recrystallization was from water. Yield 20.2 g. Melting point 213° C.

(b) 2 - amino - 3 - propionylamino - 6 - (3,4 - methyl-ene-dioxybenzylamino)pyridine·HCl was prepared analogously using propionyl chloride. Yield 20.5 g. Melting point 241° C.

Example 10

(a) 2 - amino - 3 - carbethoxyamino - 6 - p - methyl-benzylamino-pyridine·HCl. 76 g. of 2-amino-3-nitro-6-p-methyl-benzylamino-pyridine in 440 ml. of dioxane were hydrogenated as in Example 7(a) and one quarter of the hydrogenated solution analogously reacted with 8.2 ml. of chloroformic acid ethyl ester. The recrystallization was from water. Yield 12.1 g. Melting point 208–9° C.

(b) 2 - amino - 3 - propionylamino - 6 - p - methyl-benzylamino-pyridine·HCl was produced analogously using propionyl chloride. Yield 15.1 g. Melting point 268–9° C.

Example 11

(a) 2 - amino - 3 - carbethoxy - 6 - (2,4 - dimethyl-benzylamino)pyridine·HCl. 27 g. of 2-amino-3-nitro-6-(2,4-dimethylbenzylamino)pyridine in 200 ml. of dioxane were hydrogenated as is Example 7(a) and the hydrogenated solution reacted with 10 ml. of chloroformic acid ethyl ester and processed as in Example 7(a). Yield 15.8 g. Melting point 216–7° C.

(b) 2 - amino - 3 - carbethoxyamino - 6 - (2,5 - dimethylbenzylamino)pyridine·HCl was prepared analogously employing the 2,5-dimethylbenzylamino starting compound instead of the 2,4-dimethylbenzylamino compound. Yield 12.9 g. Melting point 217–8° C.

Example 12

(a) 2 - amino - 3 - carbethoxyamino - 6 - (3,4 - dimethylbenzylamino)pyridine·HCl. 37 g. of 2-amino-3-nitro-6-(3,4-dimethylbenzylamino)pyridine in 350 ml. of dioxane were hydrogenated as in Example 7(a) and one-half of the hydrogenated solution reacted with 69 ml. of chloroformic acid ethyl ester. Yield 13.1 g. Melting point 221° C.

(b) 2 - amino - 3 - propionylamino - 6 - (3,4-dimethylbenzylamino)pyridine·HCl was prepared analogously using propionyl chloride. Yield 13.1 g. Melting point 250° C. (decomposition).

Example 13

(a) 2 - amino - 3 - carbethoxyamino - 6 - p - isopropylbenzylamino-pyridine·HCl. 60 g. of 2-amino-3-nitro-6-p-isopropylbenzylamino-pyridine·HCl in 500 ml. of dioxane were hydrogenated as in Example 7(a) and one-third of the solution reacted with 7.6 ml. of chloroformic acid ethyl esters. Recrystallization was from ethanol. Yield 12 g. Melting point 217–8° C.

(b) 2 - amino - 3 - propionylamino - 6 - p - isopropylbenzylamino-pyridine·HCl. One-quarter of the hydrogenated solution obtained under (a) was reacted with 6.5 ml. of propionyl chloride and processed analogously. Yield 17 g. Melting point 242–51° C.

Example 14

2-isopropylamino - 3 - carbomethoxyamino - 6 - benzylamino-pyridine·HCl

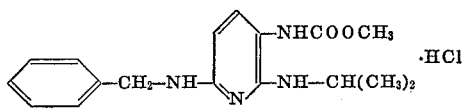

19 g. of isopropylamino-3-nitro-6-benzylamino-pyridine in 200 ml. of dioxane were hydrogenated as in Example 7(a) and the hydrogenated solution reacted with 5.8 ml. of chloroformic acid methyl ester at 15° C. After 2 hours' stirring at room temperature, the product was filtered off and recrystallized from isopropanol/ether. Yield 15 g. Melting point 202° C. (decomposition).

Example 15

2-amino-3-nitro-6-p-fluorobenzylamino-pyridine

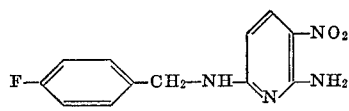

65 g. (0.52 mol) of p-fluorobenzylamine and 100 g. (0.725 mol) of powdered potassium carbonate in 500 ml. of n-propanol were heated to 90° C. 87 g. (0.5 mol) of 2-amino-3-nitro-6-chloropyridine were added portionwise while stirring within 10 minutes. The mixture was then stirred for 3 hours at boiling temperature. After cooling the reaction mixture was poured into 1.5 liters of water. The product which precipitated was filtered off and recrystallized from dioxane/water. Yield 52.4 g. Melting point 172–174° C.

Example 16

2-amino - 3 - carbethoxyamino-6-p-fluorobenzylamino-pyridine-hydrochloride

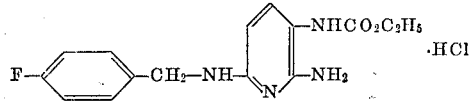

26.2 g. (0.1 mol) of 2-amino-3-nitro-6-p-fluorobenzylamino-pyridine were hydrogenated in 250 ml. of dioxane after addition of 15 g. of Raney nickel at 50° C. under a gauge pressure of 30 atmospheres. The solution was filtered off from the catalyst and reacted with 10.8 ml. (0.113 mol) of chloroformic acid ethyl ester while stirring. The reaction product which crystallized after about 15 minutes, was filtered off and recrystallized from water. Yield 19 g. Melting point 214–215° C.

Example 17

2-benzylamino-5-morpholinocarbonylamino-pyridine

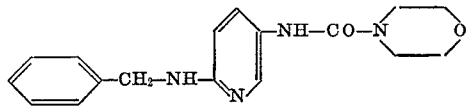

After addition of 300 ml. of dioxane 64 g. (0.32 mol) of 2-benzylamino-5-aminopyridine and 90 g. (0.6 mol) of morpholinocarboxylic acid chloride were boiled under reflux for 30 minutes. During the boiling process, the hydrochloric salt of 2-benzylamino - 5 - morpholinocarbonylamino-pyridine crystallized out. After cooling the obtained salt was filtered off, washed with isopropanol, and dissolved in 1 liter of water. The base was precipitated with the aid of 7 N ammonia, filtered off, and recrystallized from ethanol. Yield 26 g. Melting point 148–150° C.

Example 18

2-benzylamino-5-morpholinoacetamido-pyridine

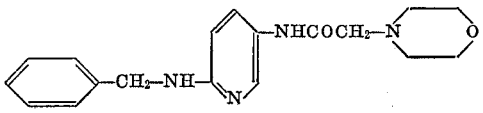

A mixture of 8 g. (0.029 mol) of 2-benzylamino-5-chloroacetamido-pyridine, 12 ml. (0.093 mol) of morpholine, and 40 ml. of isopropanol was boiled under reflux for six hours. After cooling 200 ml. of water were added to the reaction mixture. The product, 2-benzylamino-5-morpholinoacetamido-pyridine, which precipitated was filtered off, washed with water, and recrystallized from ethanol. Yield 6 g. Melting point 135–137° C.

We claim:
1. A compound selected from the group consisting of compounds of the formula

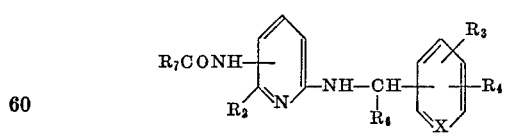

and their pharmaceutically acceptable acid addition salts wherein $R_7$ is selected from the group consisting of lower alkyl, phenyl, chlorophenyl, lower alkenyl, $R_2$ is selected from the group consisting of hydrogen and amino, $R_3$ and $R_4$ when taken jointly are methyleneoxy, $R_3$ when taken singly is selected from the group consisting of hydrogen, lower alkyl, halogen, lower alkoxy and trifluoromethyl, $R_4$ when taken singly is selected from the group consisting of hydrogen and lower alkyl, $R_6$ is selected from the group consisting of hydrogen and methyl, X is selected from the group consisting of =N— and =CH— with the proviso that when X is =N—, $R_3$ and $R_4$ are both hydrogen.

2. A compound according to claim 1 wherein $R_7$ is selected from the group consisting of lower alkyl, phenyl, chlorophenyl, vinyl, $R_4$ when taken singly is selected from the group consisting of hydrogen and methyl, and $R_3$ when taken singly is selected from the group consisting of hydrogen, lower alkyl, chloro, fluoro, methoxy and trifluoromethyl.

3. A compound according to claim 1 having the formula

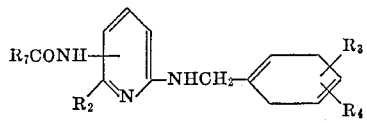

4. A compound according to claim 3 wherein $R_3$ is selected from the group consisting of lower alkyl, chloro, fluoro and methoxy and $R_4$ is selected from the group consisting of hydrogen and methyl.

5. A compound according to claim 4 wherein $R_4$ is hydrogen.

References Cited

FOREIGN PATENTS 1,462,263  12/1966  France.

HENRY R. JILES, Primary Examiner

A. L. ROTMAN, Assistant Examiner

U.S. Cl. X.R.

260—247.1, 247.2, 294.8, 294.9, 295.5, 340.9, 454, 465, 562, 999